(12) United States Patent
Rennerfeldt et al.

(10) Patent No.: US 10,946,990 B2
(45) Date of Patent: Mar. 16, 2021

(54) MATERIAL SAVING CANNING SYSTEM

(71) Applicant: Alpha Brewing Operations, Lincoln, NE (US)

(72) Inventors: Matthew Rennerfeldt, Lincoln, NE (US); Vincent C. Kieffer, Omaha, NE (US)

(73) Assignee: ALPHA BREWING OPERATIONS, Lincoln, NE (US)

( * ) Notice: Subject to any disclaimer, the term of this patent is extended or adjusted under 35 U.S.C. 154(b) by 398 days.

(21) Appl. No.: 15/867,324

(22) Filed: Jan. 10, 2018

(65) Prior Publication Data

US 2019/0031376 A1 Jan. 31, 2019

Related U.S. Application Data

(60) Provisional application No. 62/539,044, filed on Jul. 31, 2017.

(51) Int. Cl.
*B65B 7/28* (2006.01)
*B65B 57/00* (2006.01)
(Continued)

(52) U.S. Cl.
CPC ............ *B65B 7/2842* (2013.01); *B65B 43/50* (2013.01); *B65B 57/00* (2013.01); *G01G 15/00* (2013.01); *B65B 1/46* (2013.01)

(58) Field of Classification Search
CPC ......... B65B 7/2842; B65B 57/10; B65B 7/00; B65B 7/28
(Continued)

(56) References Cited

U.S. PATENT DOCUMENTS 2,684,803 A * 7/1954 Birkland ............... B65B 31/025
   53/94
3,073,398 A * 1/1963 Blodgett ................... B65B 1/34
   177/53
(Continued)

FOREIGN PATENT DOCUMENTS

CN 203381794 U 1/2014
CN 203410687 U 1/2014
(Continued)

OTHER PUBLICATIONS

Akshay K. Naphade, Manish J. Deshmukh, "A Review of 'Improved Automated Conveyor with Auto Seperated System for Oil Packaging Industry'", International Journal of Research in Advent Technology, Feb. 2017, 5 pages, vol. 5, No. 2.

*Primary Examiner* — Gloria R Weeks
(74) *Attorney, Agent, or Firm* — Talem IP Law, LLP

(57) ABSTRACT

Techniques and systems for seaming containers are described herein. The canning system can include a seamer assembly and a seamer controller. The seamer assembly includes a load cell assembly which weighs the containers and communicates with the seamer controller to determine if the container is to have a lid seamed onto the container based on the satisfaction of a predetermined weight criteria. The seamer controller is designed to receive weight measurements of the container, determine a weight criteria and whether the container has satisfied the weight criteria, command the seamer assembly whether to seam a lid to the container based on the satisfaction of the weight criteria, and send a command to the reject station to remove the container if the weight criteria is not satisfied.

20 Claims, 9 Drawing Sheets

(51) Int. Cl.
*G01G 15/00* (2006.01)
*B65B 43/50* (2006.01)
*B65B 7/00* (2006.01)
*B65B 1/46* (2006.01)

(58) Field of Classification Search
USPC .................................................. 53/53, 54
See application file for complete search history.

(56) References Cited

U.S. PATENT DOCUMENTS

| | | |
|---|---|---|
| 3,172,434 A | 3/1965 | Boucher |
| 3,577,698 A | 5/1971 | Ruekberg |
| 3,623,560 A | 11/1971 | Stone |
| 3,785,412 A | 1/1974 | Stone |
| 3,831,344 A | 8/1974 | Over |
| 3,964,237 A | 6/1976 | Johansen |
| 3,977,483 A | 8/1976 | Greanias |
| 4,019,547 A | 8/1977 | Ross |
| 4,219,986 A | 9/1980 | Osterhaus |
| 4,230,195 A | 10/1980 | Graffin |
| 4,344,493 A * | 8/1982 | Salmonsen .......... G01G 13/026 177/145 |
| 4,596,107 A | 6/1986 | Pfleger, Sr. |
| 4,629,587 A | 12/1986 | Monden |
| 4,691,496 A | 9/1987 | Anderson et al. |
| 4,765,119 A | 8/1988 | Aidlin et al. |
| 4,789,016 A | 12/1988 | Mihail |
| 4,804,024 A | 2/1989 | Arnemann |
| 4,957,753 A * | 9/1990 | Bardsley .............. B65B 1/24 220/624 |
| 5,038,839 A | 8/1991 | Morimoto et al. |
| 5,050,369 A * | 9/1991 | Fiwek .................. B67B 3/06 53/282 |
| 5,365,722 A | 11/1994 | Edwards et al. |
| 5,581,975 A | 12/1996 | Trebbi et al. |
| 5,713,403 A * | 2/1998 | Clusserath ............ B65C 3/16 141/101 |
| 5,718,268 A | 2/1998 | Muscara |
| 5,787,687 A | 8/1998 | Mueller et al. |
| 5,802,803 A | 9/1998 | Kitagawa et al. |
| 5,806,287 A | 9/1998 | Trechsel |
| 5,961,000 A | 9/1999 | Sanfilippo et al. |
| 6,655,421 B2 | 12/2003 | Kohashi et al. |
| 6,800,818 B2 | 10/2004 | Balboni et al. |
| 6,874,301 B2 | 4/2005 | Kitamoto |
| 6,978,819 B2 | 12/2005 | Tanaka et al. |
| 7,024,837 B2 | 4/2006 | Takebe et al. |
| 7,204,151 B2 | 4/2007 | Kitamoto et al. |
| 7,347,344 B2 | 3/2008 | Engels et al. |
| 7,421,833 B2 | 9/2008 | Rothbauer et al. |
| 7,549,275 B2 | 6/2009 | Monti |
| 7,603,829 B2 | 10/2009 | Brombin |
| 3,256,188 A1 | 9/2012 | Blumenstock et al. |
| 8,601,777 B2 | 12/2013 | Monti |
| 8,646,243 B2 | 2/2014 | Py |
| 9,096,334 B2 | 8/2015 | Bogle et al. |
| 9,394,153 B2 | 7/2016 | Goldman et al. |
| 2004/0045984 A1 | 3/2004 | Schuman et al. |
| 2008/0184668 A1* | 8/2008 | Monti .................. B65B 57/04 53/53 |
| 2009/0223168 A1 | 9/2009 | Zanini et al. |
| 2012/0222387 A1 | 9/2012 | Forestelli et al. |
| 2012/0240519 A1* | 9/2012 | Forestelli ............ B67B 3/261 53/284.5 |
| 2012/0304594 A1 | 12/2012 | Ansaloni et al. |
| 2017/0029142 A1 | 2/2017 | Evans |

FOREIGN PATENT DOCUMENTS

| | | |
|---|---|---|
| CN | 204642196 U | 9/2015 |
| CN | 103287596 B | 11/2015 |

* cited by examiner

MATERIAL SAVING CANNING SYSTEM

CROSS REFERENCE TO RELATED APPLICATION

This application claims the benefit of Provisional Patent Application Ser. No. 62/539,044, filed Jul. 31, 2017.

BACKGROUND

Industrial canning systems provide a way to can food stuffs and other perishable items (the "product") inside containers. However, there can be significant waste of the product as well as the container and lid when not enough of the product is placed into the containers according the specified weight. When not enough product is placed into the containers and the containers are subsequently seamed, the containers cannot be sold because they do not contain enough product and the product and the containers are wasted. Conversely, too much product placed into the containers can cause spillage of the product.

It is desirable to provide for a canning system that weighs the containers prior to seaming the containers and allows for input on whether to seam incorrectly filled containers prior to seaming a lid to the containers.

BRIEF SUMMARY

Techniques and systems for seaming containers are described herein. In one embodiment, a canning system including a seamer assembly is provided. The seamer assembly includes a load cell assembly and a seaming station. The seamer assembly receives containers filled with the product that do not yet have a seamed lid. A seamer controller receives weight measurements from the load cell assembly for the filled containers, then determines whether each filled container satisfies or does not satisfy a weight criteria. Filled containers that satisfy the weight criteria are subsequently seamed.

In another embodiment of the invention, a process for efficiently seaming filled containers is provided. The process can include placing a lid on top of a filled container via a lid apparatus and weighing the filled container via a load cell. The process also includes determining whether to seam the filled container based on: 1) the weight measurements received at the load cell, and 2) a weight criteria. The filled container is then seamed or not seamed based on the weight measurements received at the load cell and whether the weight criteria is satisfied or not satisfied.

In another embodiment of the invention, a seamer controller that includes hardware and software is provided. The seamer controller is configured to receive weight measurements from a seamer assembly and then determine a weight criteria based upon one or more predetermined criteria that includes at least a minimum weight measurement. Using the received weight measurements, the seamer controller determines if the weight criteria is satisfied or not satisfied. If the weight criteria is satisfied, the seamer controller sends a command to the seamer assembly to seam a lid onto the container. If the weight criteria is not satisfied, the seamer controller sends no command or sends a command to the seamer assembly to not perform. In some cases, the seamer controller sends a command to remove the container to a reject station when the weight criteria is not satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
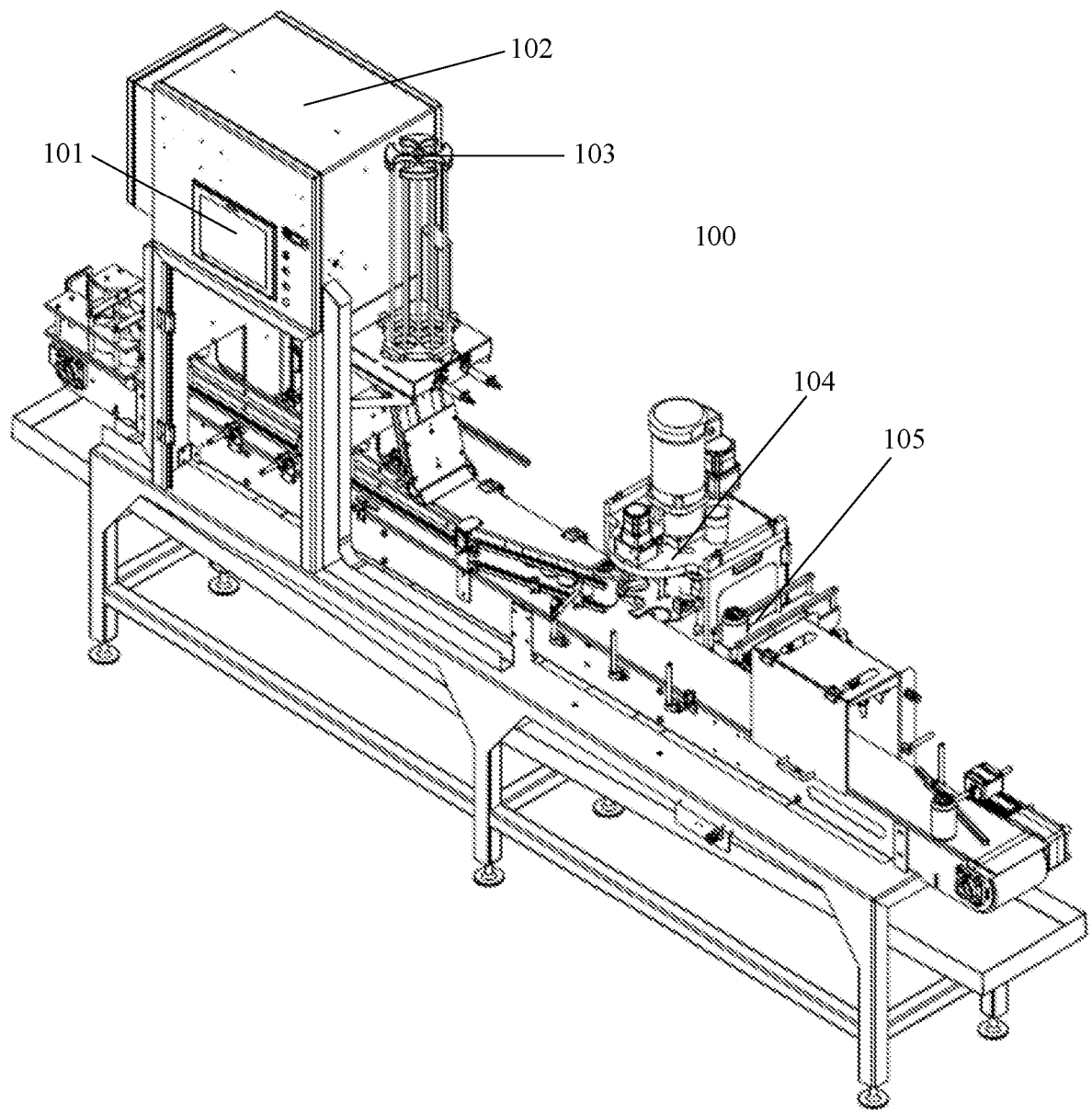
FIG. 1 illustrates an overview of a complete material saving canning system.

A canning system, a seamer controller, and a process for seaming filled containers are disclosed.

It should be understood that the features of the canning system may be implemented as a new system or standalone component or integrated into an existing canning system.

A canning system and components thereof are provided. The described canning system can receive containers that are already filled with a product. The product can be any product that needs to be seamed via a canning process, such as liquids and food stuffs, as well as other non-ingestible materials that need to be seamed.

The canning system includes a seamer assembly and a seamer controller. The seamer assembly may create a seam between a filled container and a lid. The seamer assembly includes several components, including a load cell assembly and a seaming station. The load cell assembly weighs each of the filled containers at least once, individually, before the filled containers reach the seaming station. The load cell assembly can take multiple measurements of the weight of a single filled container. For example, the load cell can take 2, 3, 4, 5, 6, 7, 8, 9, 10, 15, 20, 30, 40, 50 or 100 weight measurements within a single increment of time such as one second, two seconds, three seconds, four seconds, five seconds, ten seconds, twenty seconds, or thirty seconds. The load cell assembly communicates the results of the one or more weight measurements for each filled container to the seamer controller. The seamer controller then determines an average weight of the container from the one or more weight measurements sent from the load cell assembly. The seamer controller then determines if a weight criteria has been met.

The canning system can be set up in various ways to provide for the seaming of the lid onto the filled container. In one embodiment, the seamer assembly is programmed to always create a seam between the lid and the filled container unless the seamer assembly receives a communication from the seamer controller to not perform. In this case, the seamer controller sends the communication to not create a seam between the lid and the filled container because the filled container did not satisfy the weight criteria.

In another embodiment, the seamer assembly is programmed to never create a seam between the lid and the filled container unless the seamer assembly receives a communication from the seamer controller to perform. In this case, the seamer controller sends the communication to create a seam between the lid and the filled container because the filled container has satisfied the weight criteria.

In yet another embodiment, the seamer assembly will always receive a communication from the seamer controller for each filled container to perform or to not perform. The seamer controller sends a communication to perform based upon the satisfaction of the weight criteria and sends a communication to not perform based upon not satisfying of the weight criteria.

The weight criteria is based upon at least a minimum weight of the container. In some embodiments, the weight criteria also includes a maximum weight of the container, a user input to override the minimum weight of the container, a user input to override the maximum weight of the container, or a combination thereof. If activated, the user input to override the minimum weight and/or the maximum weight of the container will cause the weight criteria to be automatically satisfied for the purposes of the seamer assembly but will have no effect on whether the weight criteria is satisfied for the purposes of a reject station. This causes the containers to be seamed.

The weight criteria can be considered "satisfied" if the currently measured container falls within the weight range allowed for by the seamer controller. The weight criteria can be considered "not satisfied" if the currently measured container falls outside the weight range allowed for by the seamer controller.

In another embodiment, the canning system may include a reject station. The reject station includes a robotic arm and reject station storage. The reject station performs the function of removing filled containers that have not satisfied the weight criteria.

In one embodiment, the reject station is programmed to always remove filled containers unless the reject station receives a communication from the seamer controller to not perform. In this case, the seamer controller sends the communication to not remove a filled container because the filled container satisfied the weight criteria.

In another embodiment, the reject station is programmed to never remove filled containers unless the reject station receives a communication from the seamer controller to perform. In this case, the seamer controller sends the communication to remove a filled container because the filled container has not satisfied the weight criteria.

In yet another embodiment, the reject station will always receive a communication from the seamer controller for each filled container to perform or to not perform. The seamer controller sends a communication to perform based upon the satisfaction of the weight criteria and sends a communication to not perform based upon not satisfying the weight criteria.

FIG. 1 illustrates an overview of a complete material saving canning system 100. In this embodiment, users of the canning system 100 may enter the user inputs into the display 101. The display 101 is a part of a user interface system of the canning system. The user interface system is designed to receive inputs from the user which are then communicated to a seamer controller or stored so that the inputs can be retrieved when needed.

Once the canning system is in operation, filled containers enter the canning system 100. In some cases, empty containers enter the canning system 100 and are filled in the canning system 100, such as underneath the seamer controller's housing. In either case, the filled containers pass underneath the lid apparatus 103 where a lid is placed on top of the filled containers. The lid apparatus 103 may account for a number of factors when placing lids on top of filled containers, such as lid bounce, the angle of lid placement compared to the filled containers, timing, conveyor speed, and any excess product (like foam from a liquid) that may hinder placement of lids on the filled containers. Once the lid is received, filled containers continue down the conveyor where the filled containers eventually reach the seamer assembly 104. At the seamer assembly 104, the containers are weighed and, depending on the weight criteria, as well as other user inputs, are seamed or not seamed. From the seamer assembly 104, the filled containers continue along the conveyor towards the end of the canning system 100. Filled containers that do not meet the weight criteria are pulled from the conveyor and placed into the reject station 105.

It should be understood that the user inputs can be entered into the user interface system before or while the canning system is in operation. Additionally, the user interface system is set up such that the user inputs can be disseminated and implemented by the seamer controller as soon as they are entered, implemented after a certain number of containers have been processed, or implemented after a certain period of time.

Figure 2:
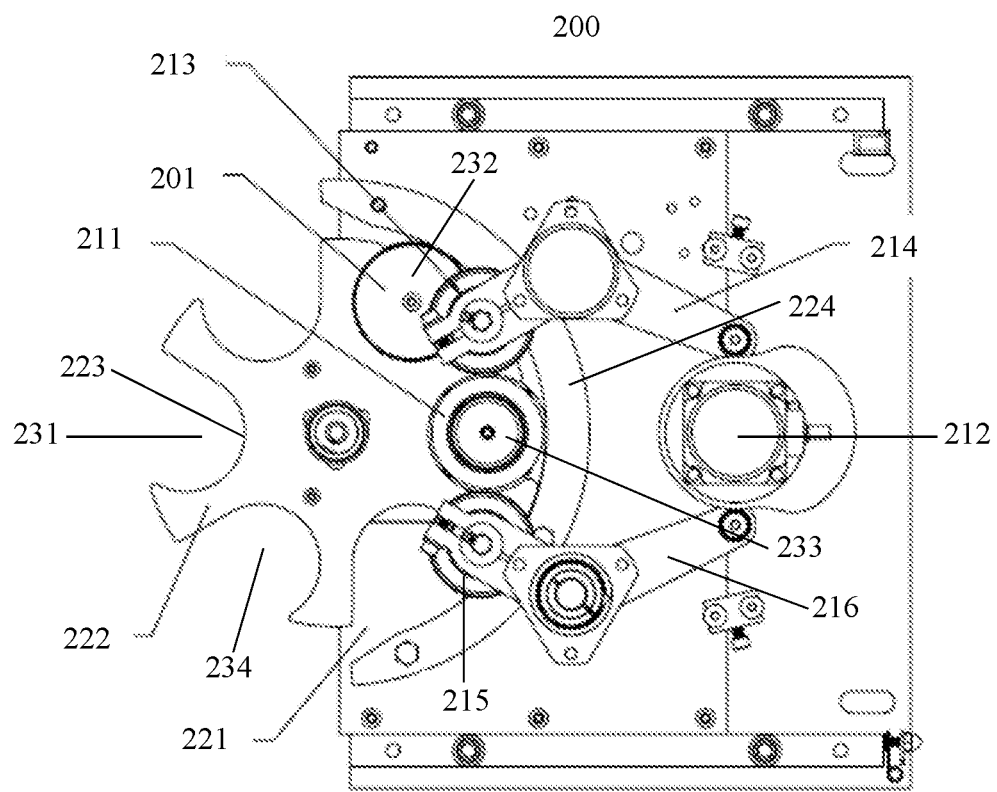
FIG. 2 illustrates a top down view of an embodiment of the seamer assembly.

FIG. 2 illustrates a top down view of an embodiment of the seamer assembly 200. This seamer assembly includes a scale platform 201, a container lift 211, a seamer chuck 212, a first seamer roller 213, a first seamer arm 214, a second seamer roller 215, a second seamer arm 216, a seamer floor 221, an index wheel 222, index wheel slots 223, and an arcuate wall 224. Furthermore, the seamer assembly contains at least three unique positions, and usually four, which are the first position 231, the second position 232, the third position 233, and the fourth position 234.

The first position 231 is the position for receiving a filled container that does not have a seamed lid. The second position 232 is the position at which a filled container that does not have a seamed lid is weighed prior to seaming the lid onto the container. The third position 233 is the position at which the filled container's lid is seamed onto the filled container. The fourth position 234 is the position at which the filled container is released from the seamer assembly 200. Each of the positions 231, 232, 233, 234 can be implemented in an index wheel 222, a robotic arm, or a conveyor belt. In some embodiments, the first and fourth positions 231, 234 may be the same position, meaning that the filled container may be received and released at the same position, however, as shown in FIG. 2, these may be two distinct positions.

In some embodiments, the filled container is stopped for a moment at each position. In some embodiments, the filled container is not stopped at any position. In some embodiments, the filled container is only stopped at some of the positions, such as at second position 232 (where the filled container is weighed) and third position 233 (where the filled container's lid may be seamed to the filled container). The length of time that a filled container is momentarily stopped at each position may be uniform, meaning that the length of time the filled container is momentarily stopped is the same length of time at each position, or may vary from position to position (e.g. the filled container is momentarily stopped for one second to be weighed at the second position 232 and then momentarily stopped for two seconds to seam the filled container's lid to the filled container at the third position 233).

In this embodiment, the index wheel 222 rotates clockwise. The index wheel slots 223 may be U-shaped, with a curved edge along the receiving side so that when an index wheel slot 223 comes into contact with a filled container, the curved edge "catches" the filled container as the index wheel 222 rotates. On the releasing side of the index wheel slot 223, the edge is straight, so that as the index wheel 222 rotates, the container is easily released. Although FIG. 2 shows six index wheel slots 223, this is not to be construed as limiting the number of index wheel slots 223 for index wheel 222. In some embodiments the index wheel may have as few as one index wheel slot 222 or many more than the six currently shown in FIG. 2. In embodiments with at least two index wheel slots 223, the seamer assembly 200 may have multiple numbers of each position 231, 232, 233, and 234 so that more filled containers can be processed through seamer assembly 200 at a time.

In operation of the system as shown in FIG. 2, as the index wheel 222 rotates clockwise, one filled container is received in each index wheel slot 223 at the first position 231. When the index wheel 222 is rotated so that the index wheel slot 223 is aligned at the first position 231, the index wheel 222 is momentarily stopped at the first position 231 to allow the filled container to move forward into the index wheel slot 223, such as on a forward moving conveyor belt. Prior to receiving the filled containers in the first position 400, lids have been loosely centered on top of each filled container. As the index wheel 222 rotates further clockwise, the filled container is secured between index wheel slot 223 and arcuate wall 224. The filled container's bottom slides on seamer floor 221, which is a smooth surface conducive for allowing a filled container to slide across seamer floor 221 without tipping or vibrating. Tipping or vibrating the filled containers could cause spillage and the wasting of product as well as require excess maintenance to be performed on the canning system to clean up the spillage of the product.

In the current embodiment, after the filled container is received within the first position 231, the index wheel 222 rotates to the second position 232. The index wheel 222 is momentarily stopped while the filled container is centered directly over the scale platform 201 at the second position 232. In another embodiment, the filled container is moved continuously through the second position 232 over a conveyor scale. In any case, a measurement of the weight of the filled container is taken at the second position 232 and sent from a weighing apparatus to a seamer controller (not shown). The weighing apparatus can be a load cell, a conveyor scale, or any type of weighing apparatus that is suitable for weighing filled containers, whether those filled containers are continuously moving while a weight measurement is taken or are stopped while a weight measurement is taken. In the embodiment shown in FIG. 2, once the weighing of the filled containers has been performed, the index wheel 222 resumes clockwise rotation.

In an embodiment, once the filled container is rotated to the third position 233, the index wheel 222 momentarily stops and the filled container is centered directly over the container lift 211. A seamer controller (not shown) is communicably connected to the container lift 211 and, based on the weight measurement(s) of an individual filled container that the seamer controller uses to determine if the filled container has satisfied a predetermined weight criteria, the seamer controller communicates to the container lift 211 whether to lift the filled container to make contact with the first and second seamer rollers 213, 215. In an embodiment, the container lift 211 is programmed to always perform and the seamer controller may communicate to a rotating chuck whether to rotate the filled container to seam the lid onto the filled container with the first and second seamer rollers 213, 215, based on whether the filled container has satisfied the weight criteria. In another embodiment, the seamer controller may communicate to both the container lift 211 and the rotating chuck whether to perform based on whether the filled container has satisfied the weight criteria. In yet another embodiment, the rotating chuck is programmed to always perform and the seamer controller may communicate to the container lift 211 whether to perform even if the filled container has not satisfied the weight criteria.

If the filled container has satisfied the weight criteria, the filled container is raised by the container lift 211 to make contact with the first and second seamer rollers 213, 215, which may be spaced at approximately the diameter of the filled container away from one another, and the rotating chuck rotates the filled container at least 180° so that the lid is seamed to the top of the filled container by first seamer roller 213 and second seamer roller 215. In some embodiments, the rotating chuck rotates the filled container 360° multiple times to ensure that the seam between the lid and the filled container is secure. If, however, the seamer controller determines that the filled container has not satisfied the weight criteria, none of the actions described at third position 233 may be performed. In other embodiments in which the seamer controller determines that the filled container has not satisfied the weight criteria, either the rotating chuck still rotates or the container lift 211 still raises the filled container to make contact with the first and second seamer rollers 213, 215, however, a seam is not created between the lid and the filled container.

The first seamer roller 213 and second seamer roller 215 may be spaced at a distance from one another that is needed to create a seam between the filled container and the lid, which is approximately equal to the diameter of the filled container where the lid is seamed to filled container. The distance and positioning between the first seamer roller 213 and the second seamer roller 215 may be changed by adjusting the position of the first seamer arm 214 for the position of the first seamer roller 213 and adjusting the second seamer arm 216 for the position of the second seamer roller 215. The first seamer roller 213 is attached at an end of the first seamer arm 214 that is proximal to the first seamer roller 213. The second seamer roller 215 is attached at an end of the second seamer arm 216 that is proximal to the second seamer roller 215. An end of the first seamer arm 214 that is distal to the first seamer roller 213 is attached to a seamer chuck 212. An end of the second seamer arm 216 that is distal to the second seamer roller 215 is attached to the seamer chuck 212. If the filled container was vertically raised to make contact with the first and second seamer rollers 213, 215, the filled container is returned to the original vertical height the filled container was at before the filled container was raised before being moved to the fourth position 234.

Once the filled container is either seamed or not seamed, the filled container is moved along to the fourth position 234. In the embodiment shown in FIG. 2, the index wheel 222 resumes the clockwise movement to the fourth position 234. In another embodiment, the filled container continues on or is returned to a conveyor system towards a fourth position, which may be a packaging or labeling station or place where completed containers are stored before further use.

In the embodiment shown in FIG. 2, once the filled container is rotated so that the filled container reaches the fourth position 234, the clockwise rotation of the index wheel 222 is momentarily stopped to allow the filled container to move forward on a conveyor belt and leave the index wheel 222.

It should be noted that the illustrated embodiment of the seamer assembly 200 (as shown in FIG. 2) is designed so that the index wheel slots 223 are equally spaced, such that the first position 231 is reached by an index wheel slot 223 at the same time that the second position 232 is reached by another index wheel slot 223, the second position 232 is reached by an index wheel slot 223 at the same time that third position 233 is reached by another index wheel slot 223, the third position 233 is reached by an index wheel slot 223 at the same time the fourth position 234 is reached by another index wheel slot 223, and the fourth position 234 is reached by an index wheel slot 223 at the same time that the first position 231 is reached by another index wheel slot 223. In other words, the index wheel 222 is configured to have an index wheel slot 223 reach all positions 231, 232, 233, and 234 at the same time. This allows for the functions performed at each position 231, 232, 233, and 234 to be performed simultaneously so that index wheel 222 stops rotating for the same length of time at each position 231, 232, 233, and 234 and filled container may be placed within each index wheel slot 223.

It should be understood that filled containers may be moved through the seamer assembly 200 by an index wheel 222, a traditional conveyor system, a track system, or by any other means understood by those skilled in the art. Furthermore, the seamer assembly 200 may be configured to move filled containers through each of the first, second, third, and fourth positions 231, 232, 233, and 234 of the seamer assembly 200 in a circular configuration (as shown in FIG. 2), in a straight line, on a series of connecting straight lines, or in any other geometrical configuration understood by those skilled in the art.

Figure 3A:
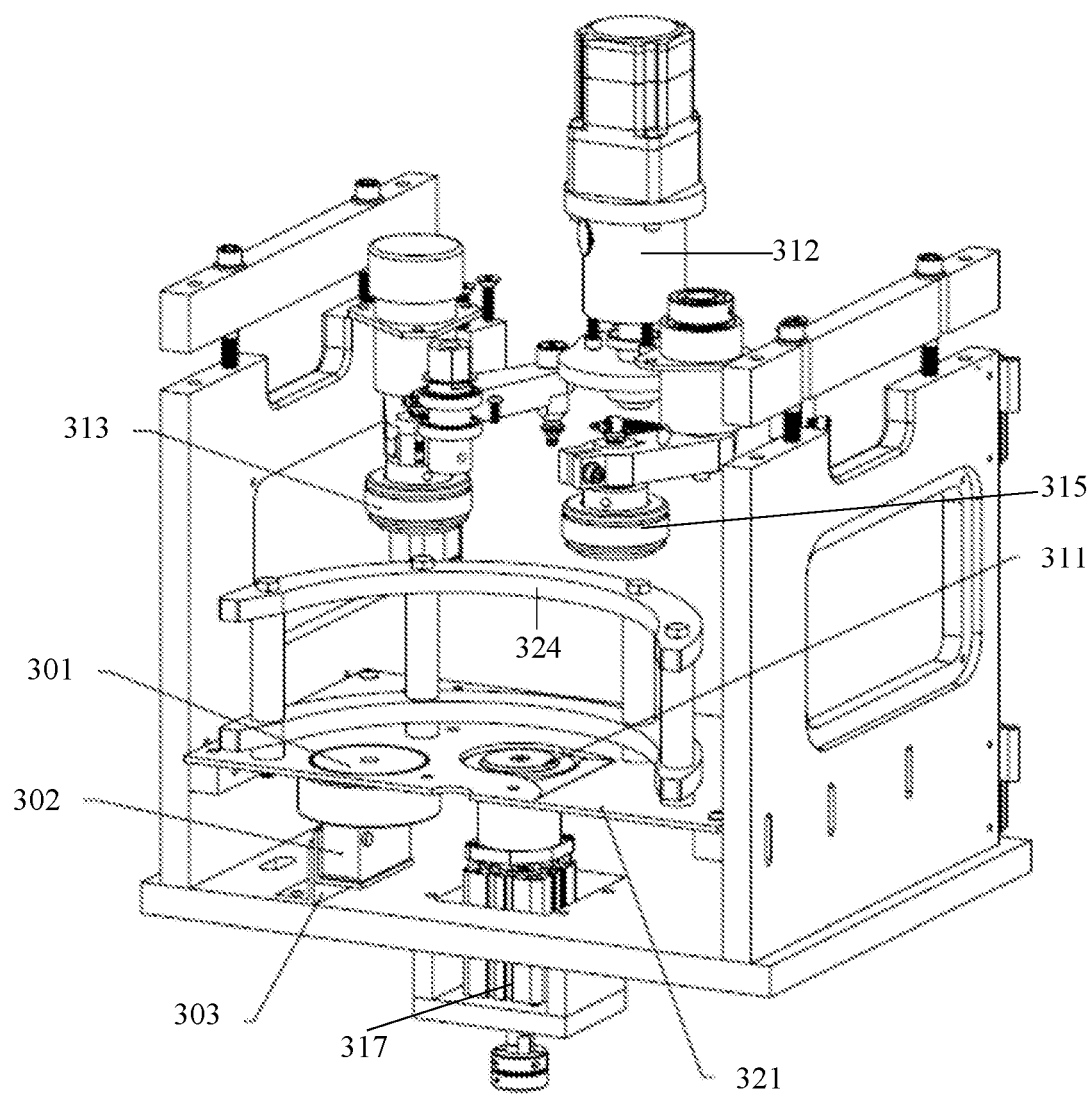
FIG. 3A illustrates an angled view of an embodiment of the seamer assembly.
Figure 3B:
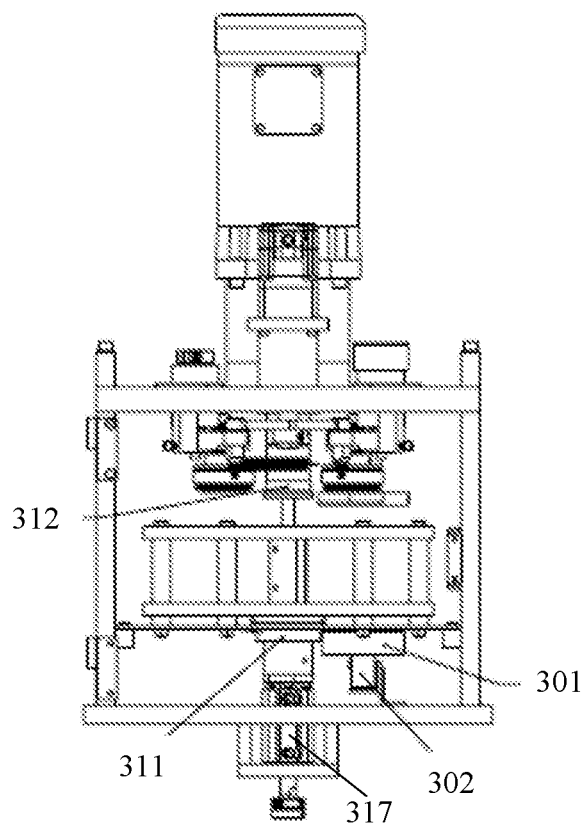
FIG. 3B illustrates a back view of an embodiment of the seamer assembly.
Figure 3C:
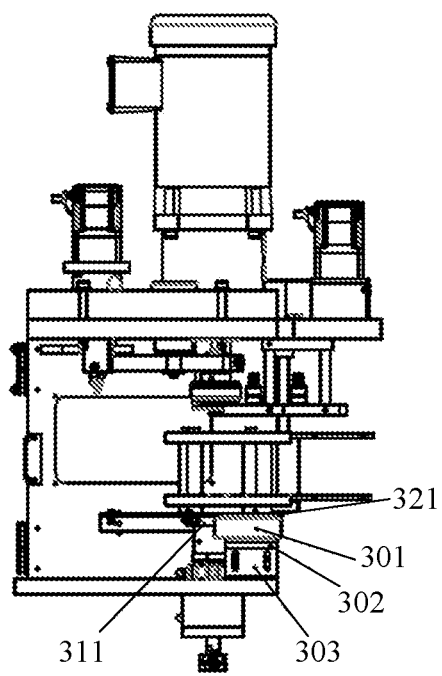
FIG. 3C illustrates a side view of an embodiment of the seamer assembly.

FIGS. 3A-3C illustrate an embodiment of a seamer assembly of the canning system. This embodiment includes a scale platform 301, a load cell 302, a load cell mount 303, a container lift 311, a seamer chuck 312, a first seamer roller 313, a second seamer roller 315, a rotating chuck 317, a seamer floor 321, and an arcuate wall 324. As a filled container with a lid loosely placed on top of the filled container is rotated through the seamer assembly, the filled container first reaches the scale platform 301 at the second position. The scale platform 301 is designed such that a circular container rests on top of the scale platform 301, however, in other embodiments, the scale platform 301 can be any shape such that a filled container may rest on top of the scale platform. In some embodiments, the scale platform 301 may be completely level with the seamer floor 321. In other embodiments, the scale platform 301 may have a slight vertical depression or lip in comparison to the seamer floor 321 so that a filled container can be positionally secured for weighing. In embodiments that incorporate a slight vertical depression or lip, the vertical depression or lip is small enough so that the filled container will simply move over the vertical depression or lip once the filled container is moved to the next position without spilling the product.

Beneath the scale platform 301 is the load cell 302, which is used to create an electrical signal whose magnitude is directly proportional to the weight of the filled container. These electrical signals are then sent to a seamer controller so that the seamer controller may determine the weight of the filled container. The weight of scale platform 301 is not required to be factored into the weight of the filled containers because the load cell 302 can be "tared" or set to zero with the scale platform 301 on top of the load cell 302. Accordingly, the load cell 302 is able to measure the weight of the filled containers, regardless of the weight of scale platform 301. The load cell 302 may be any type of load cell that is sufficient to create electrical signals whose magnitude is directly proportional to the weight of the filled container, including, but not limited to, hydraulic load cells, pneumatic load cells, and strain gauge load cells. The load cell mount 303 attaches the load cell 302 to the structure of the seamer assembly.

Once a filled container is weighed at the load cell assembly, the filled container moves to the seaming station. In the embodiment presently shown in FIG. 3, the movement from the load cell assembly to the seaming station is accomplished when the filled container is rotated within an index wheel that secures the filled container between the index wheel and the arcuate wall 324. The arcuate wall 324 may be a solid, curved wall, or, as shown in FIG. 3A, may be made up of more than one curved pieces that are attached vertically. As the filled container is rotated around the seamer assembly, the bottom of the filled container slides on a low friction seamer floor 321 so that the filled container does not tip over or vibrate, causing the product to be spilled.

Once the filled container reaches the seaming station at the third position, the filled container rests over top of the container lift 311. The container lift 311 moves the filled container in a vertical direction until the edge of the lid and the top of the filled container reaches the first and second seamer rollers 313, 315, which are held in place by the seamer chuck 312. Next, the rotating chuck 317 rotates the filled container at least 180°, creating a seam between the lid and the filled container. In some embodiments, the filled container is rotated 360° by the rotating chuck 317. In other embodiments, the filled container is rotated 360° multiple times to create tight seam between the lid and the filled container.

As used herein, "signal" and "communication" may be used interchangeably.

In some embodiments, the container lift 311 raises and lowers filled containers through the use of one or more servo motors. The servo motor may be communicably connected to a seamer controller or some other controller that sends a signal to the motors when to raise, when to lower, and when to simply do nothing to filled containers. In some embodiments, the seamer controller sends these signals based upon whether a particular filled container has satisfied the weight criteria. In some embodiments, the seamer controller may communicate to the servo motor a pre-programmed height at which the servo motor is to raise the filled container. In other embodiments, the seamer controller receives signals from a vertical sensor that senses when the lid and filled container have contacted the first and second seamer rollers 313, 315. Upon receipt/confirmation from the vertical sensor that the filled container has contacted the first and second seamer rollers 313, 315, the seamer controller may communicate to the servo motor to cease upward vertical movement.

After the rotation of the servo motor is completed, the seamer controller may communicate to the servo motor to begin downward vertical movement. The seamer controller may communicate to the servo motor when to stop the downward vertical movement based upon a predetermined amount (back to the original vertical height) or by use of another vertical sensor that communicates to the seamer controller when the filled container is back to the filled container's original vertical height.

In some embodiments, the rotating chuck 317 rotates filled containers through the use of one or more servo motors. The servo motors may be communicably connected to a seamer controller or some other controller that sends a signal to the motors when to rotate the filled containers and when to do nothing. In some embodiments, the seamer controller sends these signals based upon whether a particular filled container has satisfied the weight criteria. In some embodiments, the seamer controller may communicate to the servo motor a pre-programmed amount of rotation at which the servo motor is to rotate the filled container. In other embodiments, the seamer controller receives signals from a vertical sensor that senses when the lid and filled container have contacted the first and second seamer rollers 313, 315. Upon receipt/confirmation that the filled container has contacted the first and second seamer rollers 313, 315, the seamer controller communicates with the rotational servo motor to rotate the filled container. In other embodiments, the servo motors may be replaced by adequate alternatives, including but not limited to, DC motors and stepper motors.

Figure 4:
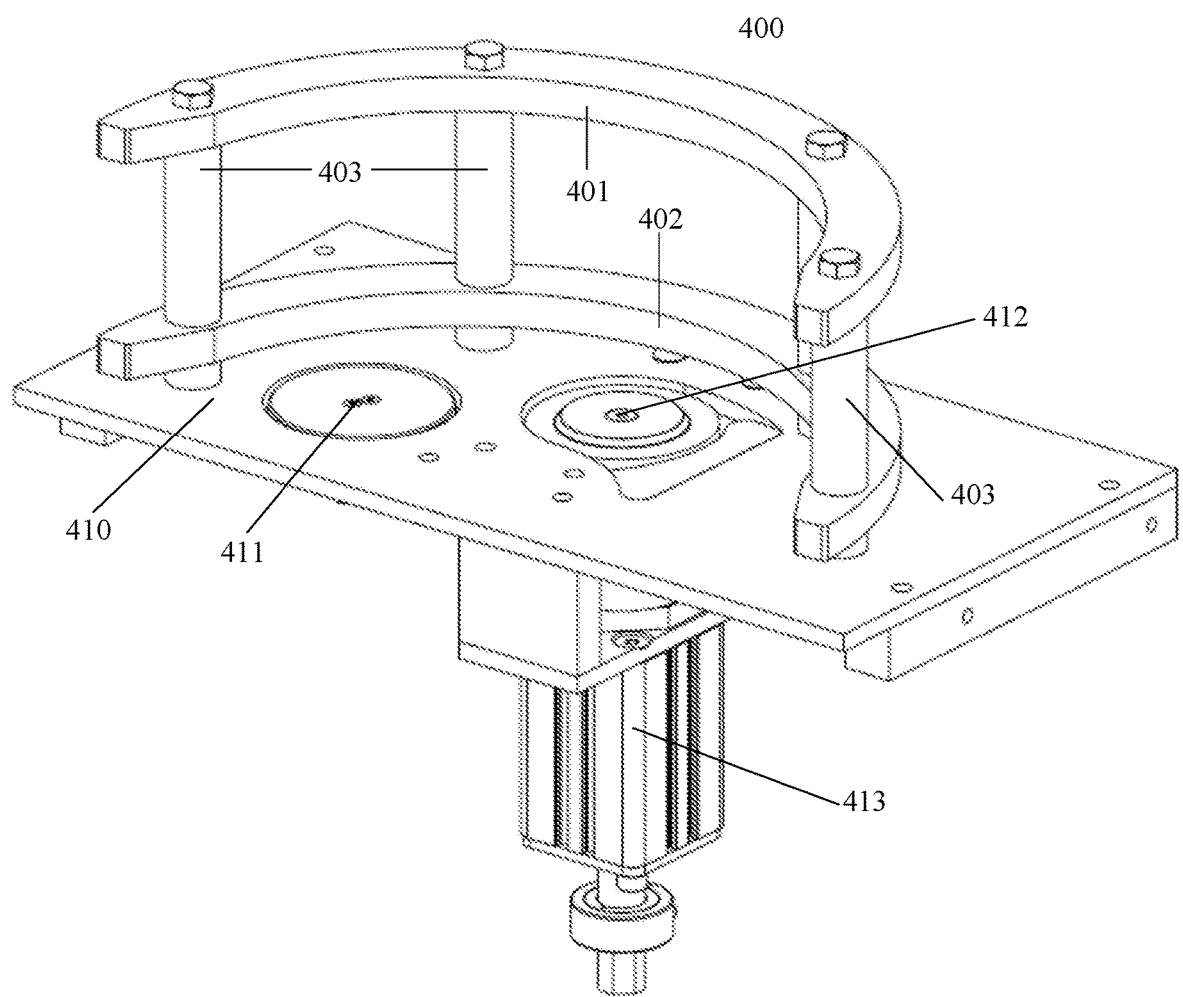
FIG. 4 illustrates an angled view of an embodiment of the seamer assembly.

FIG. 4 illustrates a portion of the seamer assembly and includes an arcuate wall 400, a first curved, arcuate structure 401, a second curved, arcuate structure 402, a plurality of vertical structures 403, a seamer floor 410, a scale platform 411, a container platform 412, and a rotating chuck 413. In this embodiment, the arcuate wall 400 provides a semi-circular structure to guide a filled container as the filled container is moved by an index wheel through the seamer assembly. In this embodiment, the arcuate wall 400 is made up of a first curved, arcuate structure 401 and a second curved, arcuate structure 402. The first and second curved, arcuate structures 401, 402 are connected by a plurality of vertical structures 403. The first and second curved, arcuate structures 401, 402 provide at least two points of contact along the body of a filled container. In other embodiments, the arcuate wall may include more than two curved, arcuate structures to provide a plurality of contact points. In other embodiments, the arcuate wall 400 may be made of one solid piece that is the approximate height of a filled container so that the filled container will contact the arcuate wall along the surface of the filled container. In any case, the arcuate wall 400 is designed such that a filled container will slide across the seamer floor 410 in a manner that does not create enough vibration or tipping to spill any of the product in the filled container. The design of the arcuate wall can implement a "slip vs. tip" calculation to ensure none of the product is lost through vibration or tipping of the filled container.

When a filled container is moved through the seamer assembly, the filled container first reaches the scale platform 411 at the second position so that the filled container may be weighed. Next, the filled container is moved to the container platform 412, which is vertically raised to seam a lid to the filled container. The rotating chuck 413 then rotates the filled container about a vertical axis to seam the lid to the filled container across the entire portion of the filled container that is covered by the lid. Finally, the filled container is returned to the filled container's original vertical height and moved through and out of the seamer assembly.

Figure 5:
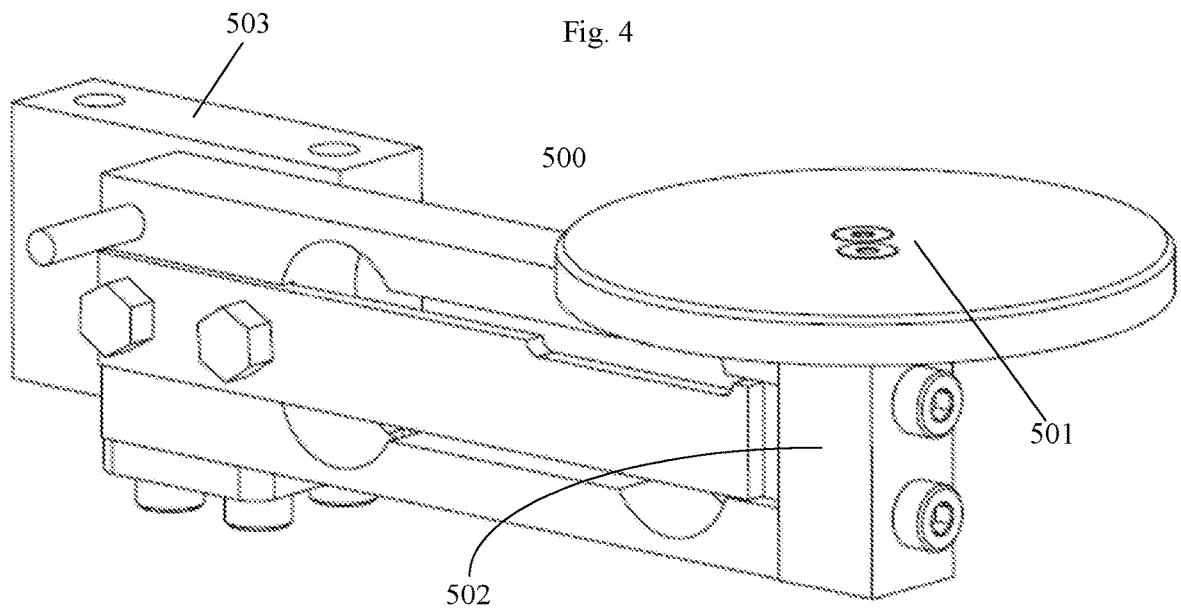
FIG. 5 illustrates an angled view of an embodiment of the load cell assembly.

A load cell assembly 500 and the load cell assembly's components are illustrated in FIG. 5. The components include a scale platform 501, a load cell 502, and a load cell mount 503. When in use, a filled container is centered over the scale platform 501. The displacement caused by the weight of the filled container is measured by the load cell 502 as a signal that may be sent directly to a seamer controller or sent to a load cell amplifier before being sent to the seamer controller. The signal is converted by the seamer controller into a weight measurement. The load cell mount 503 attaches the load cell assembly 500 to the rest of the canning system. In a specific embodiment, the load cell is an Anyload 108AA load cell that is communicably connected to a Mettler Toledo IND110 load cell amplifier. The IND110 amplifies and calibrates the signal from the load cell and creates an industry standard 4-20 milliamp analog signal. From the IND110, the analog signal is sent to the seamer controller that converts the analog signal into a weight measurement that is used to determine whether the filled container has satisfied the weight criteria.

Figure 6A:
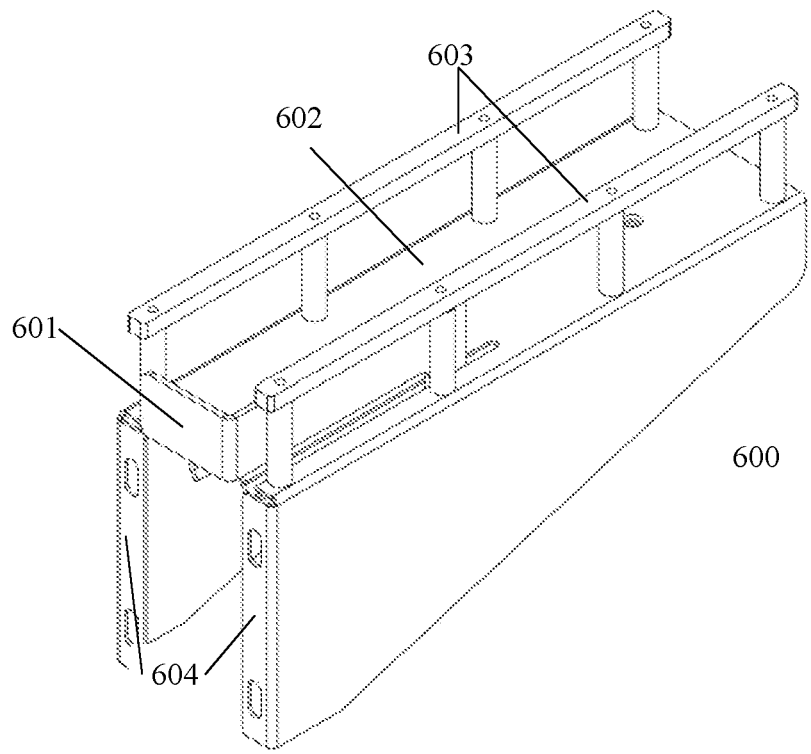
FIG. 6A illustrates an angled view of an embodiment of the reject station in a closed position.
Figure 6B:
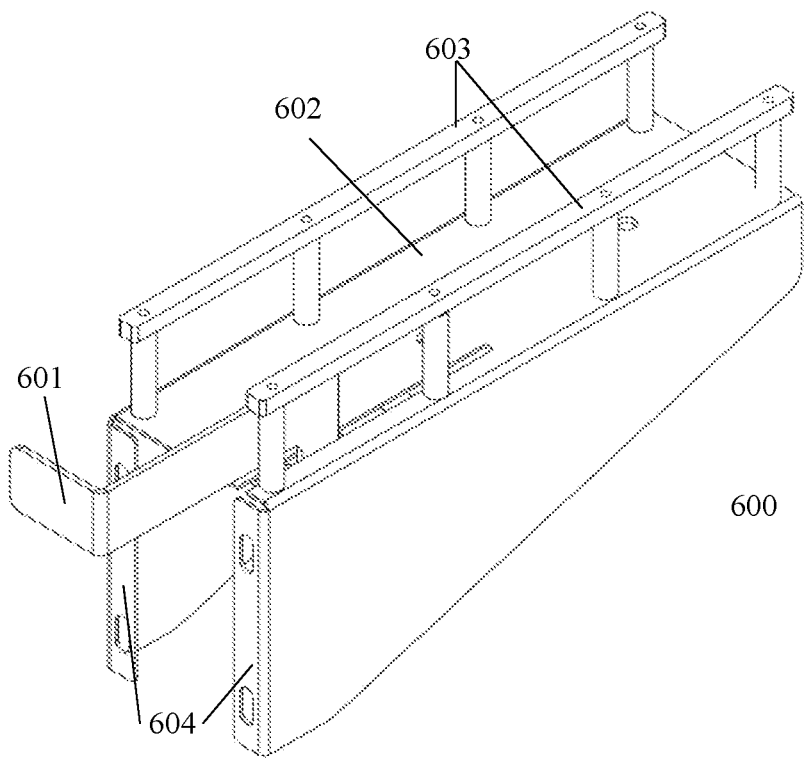
FIG. 6B illustrates an angled view of an embodiment of the reject station in an open or receiving position.

FIGS. 6A and 6B illustrate a reject station 600. Included in this embodiment of the reject station 600 is a robotic arm 601, reject station storage 602, reject station walls 603, and a reject station mount 604. The reject station mount 604 attaches the reject station 600 to the structure of the canning system. The reject station storage 602 provides a space for filled containers that do not satisfy a weight criteria to be placed. The reject station walls 603 keep the filled containers within the reject station storage 602. In FIG. 6A, the robotic arm 601 is in a closed position. In the closed position, the robotic arm 601 will not take a filled container out of circulation from the rest of the filled containers. In FIG. 6B, the robotic arm 601 is in an open or receiving position. In the receiving position, the robotic arm 601 will receive a filled container from the canning system conveyor belt, and then return to the robotic arm's original position (as shown in FIG. 6A). When returning back to the robotic arm's original position, the robotic arm pulls a filled container into the reject station storage 602. The reject station storage 602 can be designed to hold any number of filled containers at a time.

In some embodiments, the reject station 600 may be communicably connected to a seamer controller. When a filled container does not satisfy the weight criteria, the seamer controller sends a signal to the reject station 600 to remove the unsatisfactory filled container from the canning system conveyor belt and into the reject station storage 602. The reject station 600 may be positioned at any point in the canning system after the filled container has been weighed. In some embodiments, the reject station 600 is placed immediately after the load cell assembly (not shown) so that any filled containers that do not meet the weight criteria may be immediately removed from the canning system conveyor belt. In other embodiments, the reject station 600 is placed at a point after the filled containers have been through the seaming station. By placing the reject station 600 at a point after the seaming station, users may select to seam filled containers that do not satisfy the weight criteria, via the seamer controller, yet still remove the filled containers that do not satisfy the weight criteria. This can be desirable to users who wish to give away the filled containers that do not satisfy the weight criteria as employee compensation or as charity to others. However, users may still choose to not seam the filled containers that do not satisfy the weight criteria and remove them via the reject station 600 if the reject station 600 is placed after the seaming station.

In some embodiments, the reject station 600 may be disabled from a user input via the seamer controller. In other embodiments, the reject station 600 may be disabled by a manual override. In either case, if the reject station 600 is disabled, the filled containers will bypass the reject station 600, regardless of whether the filled containers satisfied or did not satisfy the weight criteria.

Figure 7A:
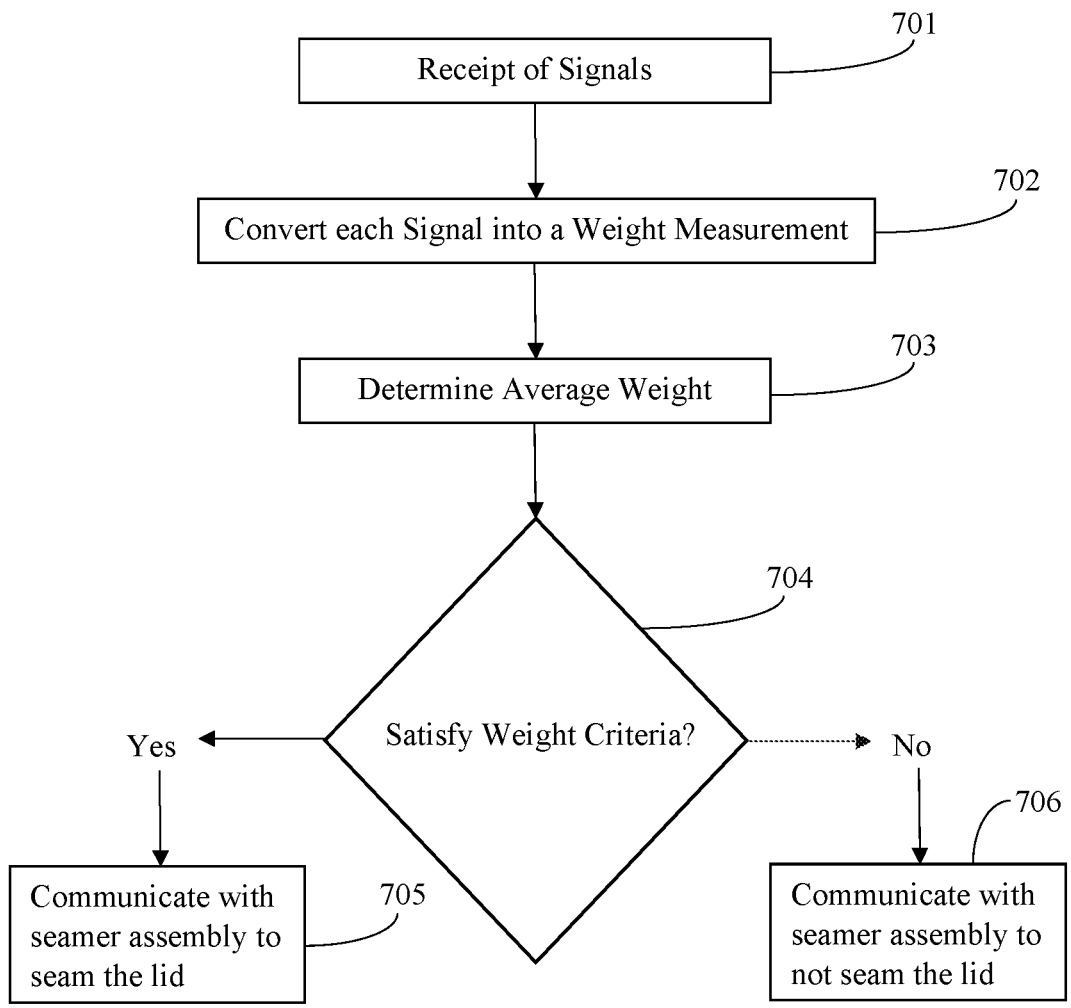
FIGS. 7A-C are flowcharts illustrating an example operation performed by the seamer controller according to differing embodiments of the invention.
Figure 7B:
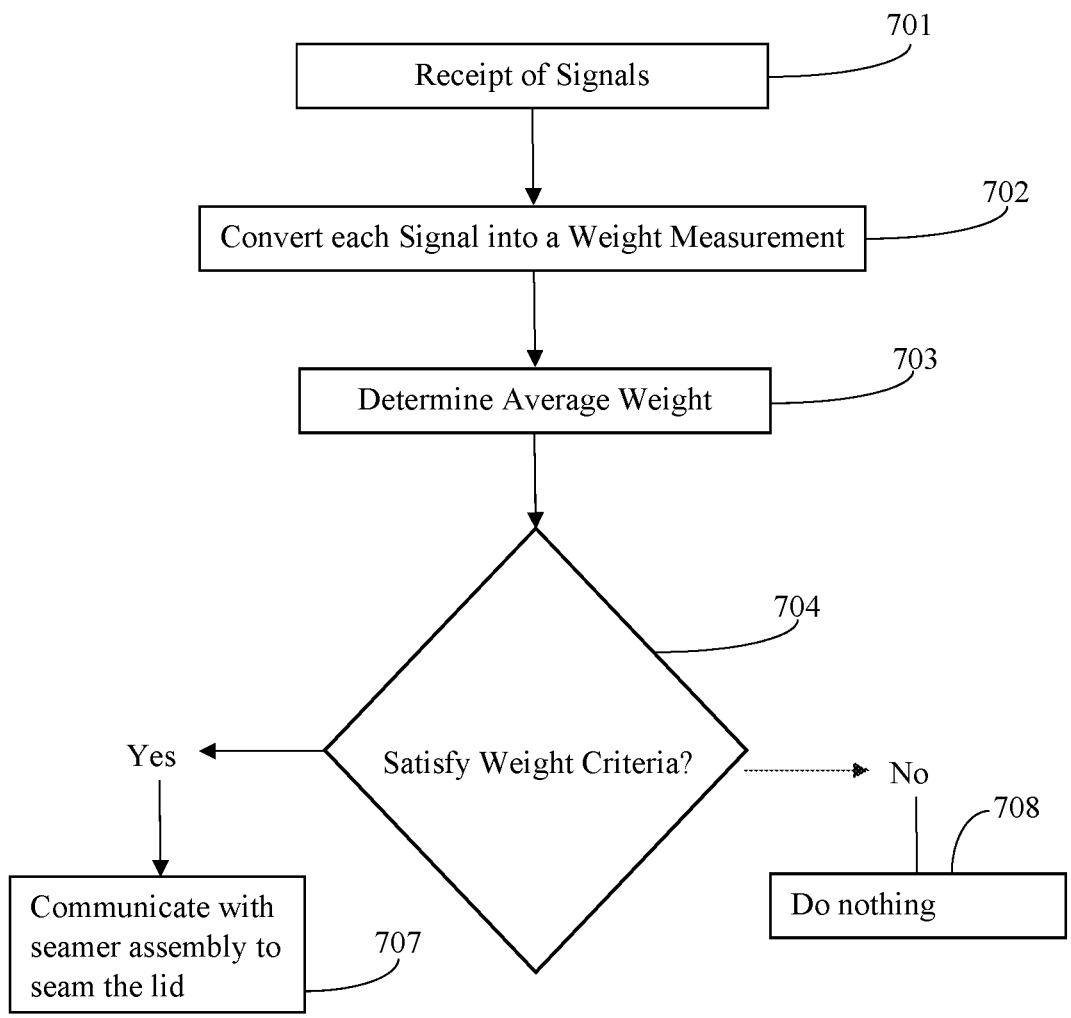
Figure 7C:
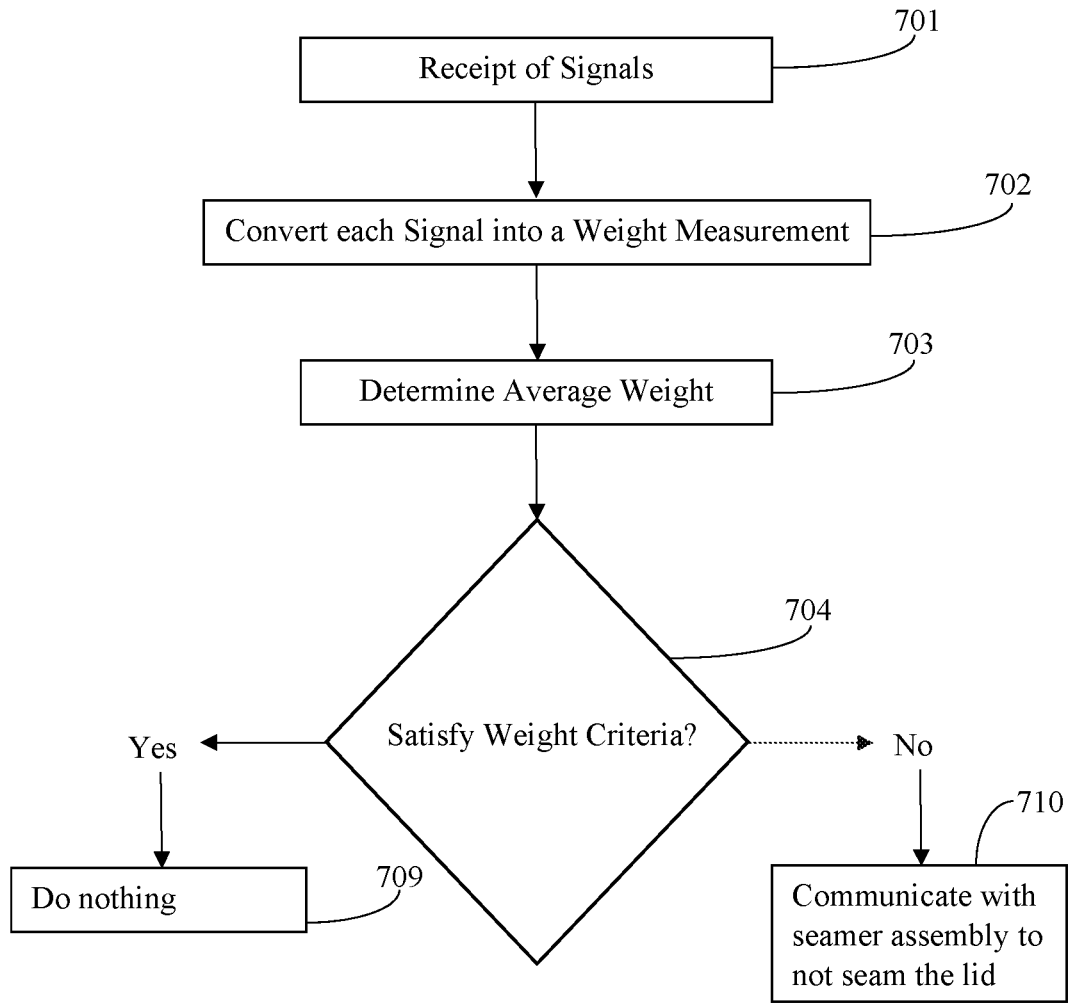

FIGS. 7A-7C illustrate embodiments of the decision making process of the seamer controller. Initially, the seamer controller receives at least one signal (701) from the load cell assembly whose magnitude is directly proportional to the weight of the filled container. Next, the seamer controller converts each signal that is received from the load cell assembly into numerical weight measurements (702). Next, the seamer controller determines an average weight of the filled container (703) by adding all of the numerical weight measurements together and dividing the sum by the number of numerical weight measurements. After determining the average weight, the seamer controller then performs a function to determine if the average weight of the filled container satisfies a weight criteria (703). The weight criteria may be include a minimum weight and a maximum weight. In some embodiments, the weight criteria only includes a minimum weight. In those embodiments having a single value as the weight criteria, if the average weight of the filled container is greater than or equal to the minimum weight, the average weight has satisfied the weight criteria. If the average weight is less than the minimum weight, the average weight has not satisfied the weight criteria and the seamer controller communicate with the seamer assembly to not seam the lid.

In embodiments that include a maximum weight as part of the weight criteria, the seamer controller will perform a function to determine if the average weight of the filled container is less than or equal to the maximum weight as well as determine if the average weight of the filled container is greater than or equal to the minimum weight to determine if the weight criteria has been satisfied. In these embodiments, if the average weight of the filled container is not greater than or equal to the minimum weight OR the average weight of the filled container is not less than or equal to the maximum weight, the weight criteria will not be satisfied.

In some embodiments, a user can provide an input through the user interface that will command the seamer controller to communicate with the seamer assembly to seam filled containers even if they do not satisfy the weight criteria. In some of these embodiments, the filled containers that do not satisfy the weight criteria will be removed from the canning system conveyor belt via the reject station.

In one embodiment, as illustrated in FIG. 7A, if a filled container satisfies the weight criteria (704), the seamer controller will communicate to the seamer assembly to seam the lid onto the filled container (705). If the filled container does not satisfy the weight criteria (704), the seamer controller will communicate to the seamer assembly to not seam the lid onto the filled container (706).

In another embodiment, as illustrated in FIG. 7B, if a filled container satisfies the weight criteria (704), the seamer controller will communicate to the seamer assembly to seam the lid onto the filled container (707). If the filled container does not satisfy the weight criteria (704), the seamer controller will simply do nothing (708). The reason the seamer controller will do nothing is because, in this embodiment, the seamer assembly will not seam a lid to the filled container without instructions to do so.

In yet another embodiment, as illustrated in FIG. 7C, if a filled container satisfies the weight criteria (704), the seamer controller will simply do nothing (709). The reason the seamer controller will do nothing is because, in this embodiment, the seamer assembly will automatically seam a lid to the filled container unless provided with instructions not to do so. If the filled container does not satisfy the weight criteria (704), the seamer controller will communicate to the seamer assembly to not seam the lid onto the filled container (710).

Figure 8:
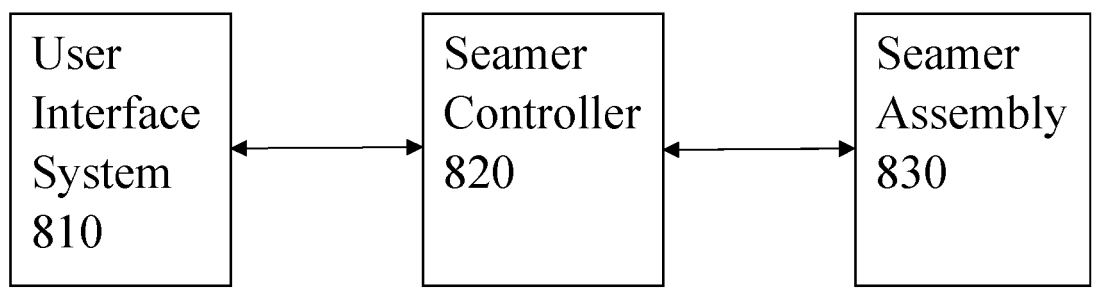
FIG. 8 shows the interaction between the user interface system, the seamer controller, and the seamer assembly according to an embodiment of the invention.

As illustrated in FIG. 8, the seamer assembly 830 communicates with the seamer controller 820 by sending one or more signals whose magnitude is directly proportional to the weight of the filled container. The seamer controller 820 communicates commands to the seamer assembly 830, such as those described in regard to FIGS. 7A-7C. In some embodiments, the user interface system 810 is given the weight criteria by a user who inputs the minimum and/or maximum weight into the user interface system through a graphical user interface. In some embodiments, the minimum weight is already pre-programmed into the user interface system so that a user does not need to input a minimum weight. In some embodiments, a user may input an override into user interface system 810 so that seamer controller 820 will allow for filled containers that do not satisfy the weight criteria to be seamed, but still have seamer controller 820 communicate with the reject station to place filled containers that do not satisfy the weight criteria into the reject station.

A user may enter the "user input(s)" through the user interface system 810 to direct the weight criteria and the values can be stored as part of the weight criteria in a storage system. The seamer controller 820 may then access the storage system to obtain the weight criteria. The user interface system 810 may include a display and a user input device. These features may be embodied in a single device, such as a touchscreen attached to the canning system or a tablet that is wirelessly connected to the canning system, or may be embodied in several devices, such as a remote control (as the user input device) and a visual screen (as the display). In addition, the user interface system 810 may include an audio interface to output to and receive audio signals from the user. For example, the audio interface may be coupled to a speaker to provide audio output and to a microphone to receive audio input, such as to receive a verbal command. Visual output may be provided via a display. In some cases, the display may be a touch screen display. In other cases, user input elements, such as buttons, keys, roller wheel, and the like are used to select items displayed as part of a graphical user interface on a touchscreen or non-touchscreen display. A keypad can also be included for user input. The keypad may be a physical keypad or a soft keypad generated on the touch screen display.

In some embodiments, the user interface system 810 may include other devices to send to and receive information from a user remote from the canning system, such as through a mobile app. As an example, the mobile app features of the user interface system 810 may receive the minimum weight (as well as any other user input that may be needed) from a user via a separate device executing the mobile app. The mobile app can provide any information to the user, such as the number of containers that have been seamed, the number of containers that have not met the weight criteria, etc.

By way of example, and not limitation, computer-readable storage media may include volatile and non-volatile memory, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include transitory media such as propagating signals.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A canning system comprising:
 a seamer assembly comprising a seaming station, a load cell assembly, and an index wheel, the seamer assembly receiving filled containers that do not yet have a seamed lid, wherein the seaming station and the load cell assembly are located along a circumference of the index wheel, wherein the load cell assembly is configured to weigh each filled container of the filled containers.

2. The canning system of claim 1, wherein the index wheel of the seamer assembly comprises multiple slots for receiving each filled container of the filled containers;
 wherein the seamer assembly further comprises an arcuate wall; and
 wherein the index wheel rotates such that each filled container of the filled containers is received and moved between the slots and the arcuate wall.

3. The canning system of claim 1, wherein the seaming station comprises a container lift and a seamer chuck, the container lift raising a filled container in a vertical direction and the seamer chuck lowering towards the filled container in a vertical direction such that a lid can be pressed into the filled container to create a seam between the lid and the filled container.

4. The canning system of claim 1, further comprising a controller that receives signals indicating weight measurements from the load cell assembly for the filled containers and determines whether each filled container of the filled containers satisfies or does not satisfy a weight criteria.

5. The canning system of claim 4, wherein the seaming station seams all filled containers even if a filled container has not satisfied the weight criteria.

6. The canning system of claim 4, further comprising a user interface system comprising a display and a user input device in communication with the controller.

7. The canning system of claim 4, further comprising a reject station located subsequent to the seaming station for removing containers that do not satisfy the weight criteria based upon a communication from the controller.

8. The canning system of claim 7, wherein the reject station comprises a reject arm and a reject storage, the controller communicating with the reject arm to remove the containers that do not satisfy the weight criteria into the reject storage.

9. The canning system of claim 7, further comprising a reject station override to bypass the reject station.

10. The canning system of claim 7, wherein the controller is further configured to receive an override command;
 wherein when the controller determines that the weight criteria is not satisfied for a particular container and the override command is received, the controller sends a communication to seam the particular container to the seaming station.

11. The canning system of claim 10, wherein the controller is further configured to, when the weight criteria is not satisfied for the container and the override command is received, send a communication to the reject station to remove the particular container.

12. The canning system of claim 4, wherein the seaming station seams filled containers that satisfy the weight criteria in response to a communication from the controller.

13. The canning system of claim 4, wherein if a particular filled container of the filled containers is determined to satisfy the weight criteria, the controller communicates with the seamer assembly to seam a lid on the particular filled container of the filled containers; and
 wherein if the particular filled container of the filled containers is determined not to satisfy the weight criteria, the controller communicates with the seamer assembly to not seam the lid on the particular container of the filled containers.

14. The canning system of claim 4, wherein the load cell assembly provides signals for a plurality of weight measurements for each container of the filled containers to the controller.

15. The canning system of claim 4, wherein the weight criteria comprises a minimum weight and a first user option, the first user option indicating an override of the minimum weight and indicating for the seamer assembly to seam the lid.

16. The canning system of claim 15, wherein the weight criteria further comprises a maximum weight and a second user option, the second user option indicating an override of the maximum weight and indicating for the seamer assembly to seam the lid.

17. A canning system comprising:
 a seamer assembly receiving filled containers that do not yet have a seamed lid, the seamer assembly consisting essentially of:
  a seaming station seaming a lid onto each filled container of the filled containers; and
  a load cell assembly measuring a weight of each filled container of the filled containers.

18. The canning system of claim 17, further comprising a controller that receives the measurements of the weight of each filled container of the filled containers from the load cell assembly and determines whether each filled container of the filled containers satisfies or does not satisfy a weigh criteria.

19. The canning system of claim 18, further comprising a user interface system comprising a display and a user input device in communication with the controller.

20. The canning system of claim 18, further comprising a reject station located subsequent to the seamer assembly for removing containers that do not satisfy the weight criteria based upon a communication from the controller.

* * * * *